(12) United States Patent
Fleischer et al.

(10) Patent No.: US 8,890,889 B1
(45) Date of Patent: Nov. 18, 2014

(54) SYSTEM AND METHOD FOR GENERATING A POSE OF AN OBJECT

(75) Inventors: Kurt Fleischer, Piedmont, CA (US); Kenrick Kin, San Jose, CA (US)

(73) Assignee: Pixar, Emeryville, CA (US)

( * ) Notice: Subject to any disclaimer, the term of this patent is extended or adjusted under 35 U.S.C. 154(b) by 879 days.

(21) Appl. No.: 12/766,832

(22) Filed: Apr. 23, 2010

Related U.S. Application Data

(60) Provisional application No. 61/174,351, filed on Apr. 30, 2009.

(51) Int. Cl.
*G09G 5/00* (2006.01)
(52) U.S. Cl.
USPC ........................................ 345/619
(58) Field of Classification Search
None
See application file for complete search history.

(56) References Cited

PUBLICATIONS

Berry "Poser 7th Cloth Room Tutorial", http://www.planit3d.com/source/tutorial_files/poser7/4/p7cloth1.html, 2007.*
WooYah, http://www.morphography.uk.vu/pdf/posing.pdf available on internet since 2006.*
Smithmicro Tutorials http://poser.smithmicro.com/tutorials/cloth_types.html available on internet since Jun. 2008.*
Rekimoto et al. SmartSkin: an infrastructure for freehand manipulation on interactive surfaces ACM CHI Conference. p. 113-120, 2002.*
Relik, http://forum.runtimedna.com/archive/index.php/t-33164.html, available on internet on Nov. 20, 2007.*
"Clothing Your Figures in Poser", by Smith Micro Software, Inc. first available on line @ http://poser.smithmicro.com/tutorials/cloth_types.html Jun. 21, 2008.*
Murdock, Poser 7 Revealed Attach Props to Elements, available http://www.awn.com/vfxworld/poser-7-revealed-attach-props-elements-since Jun. 2007.*
Clothing Designer: OBJ2CR2 File Converter, http://web.archive.org/web/20080312040934/http://www.philc.net/OBJ2CR2_page1.htm since Mar. 2008.*
Creating Conforming Clothing for Poser Figures http://web.archive.org/web/20080519134722/http://my.smithmicro.com/tutorials/1643.html available online since May 2008.*
Poser 7 Tutorial Manual for Windows and Mac OS X, available online http://www.smithmicro.com/support/faq-graphics/downloads/poser_7_tutorial_manual.pdf since 2006.*

* cited by examiner

*Primary Examiner* — Xiao Wu
*Assistant Examiner* — Yingchun He
(74) *Attorney, Agent, or Firm* — Patterson & Sheridan LLP (57) ABSTRACT

A computer-implemented method for generating a pose of an object in an interactive application executing on processor. The method includes receiving a posing template that defines a posing path for one or more objects, receiving a graphics object to be posed, and receiving user input that positions the graphics object to conform to at least a portion of the posing path defined by the posing template.

20 Claims, 7 Drawing Sheets

SYSTEM AND METHOD FOR GENERATING A POSE OF AN OBJECT

CROSS-REFERENCE TO RELATED APPLICATIONS

This application claims benefit of U.S. provisional patent application Ser. No. 61/174,351, filed on Apr. 30, 2009, which is hereby incorporated herein by reference.

BACKGROUND

1. Field of the Invention

Embodiments of the invention relate generally to computer software, and more specifically, to a system and method for generating a pose of an object.

2. Description of the Related Art

Using conventional computer animation systems, a user may alter the pose of an object, such as a character, using a variety of tools. Animators often use forward kinematics to pose articulated characters for key framing. Poses are set at different points in time, called key frames, and then the computer fills in the frames between the key frames. However, forward kinematics requires the specification of joint rotations one at a time. For example, to get a character's hand to a desired location, an animator must rotate the shoulder, then the elbow, and then the wrist. Additionally, each of these joints may have more than one rotational degree of freedom, making the task even more tedious and time-consuming for the user.

A technique for posing a character that overcomes some of these challenges is known as inverse kinematics. Inverse kinematics allows intermittent joints to be posed, but requires the user to select and modify several attributes, such as which bones or joints are to be constrained and which bones or joints are to be solved for by the inverse kinematic system. Also, the solution to an inverse kinematics problem is not unique, as there are many different potential solutions.

Accordingly, there remains the need in the art for an improved technique for posing an object in a computer software application.

SUMMARY

Embodiments of the invention are directed to creating a posing template that is representative of a line of action associated with a character. According to various embodiments, the "line of action" is an imaginary line that extends through the body of the character that serves as the foundation of a pose of the character. Some animators prefer to draw characters in a manner that accentuates the line of action, thereby enhancing the dramatic effect of the pose. Embodiments of the invention provide techniques for the animator to collide the character against the posing template such that the contour of the character conforms to the shape of the posing template. This technique allows the animator to quickly pose the character by reducing the need to individually specify the pose of each of the many intermittent joints of the character.

One embodiment of the invention provides a computer-implemented method for generating a pose of an object in an interactive application executing on processor. The method includes receiving a posing template that defines a posing path for one or more objects, receiving a graphics object to be posed, and receiving user input that positions the graphics object to conform to at least a portion of the posing path defined by the posing template.

One advantage of embodiments of the invention is that the character can be posed very quickly since the need to specify intermittent joints is reduced or eliminated.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention provide a system and method that allows animators to specify a posing template to collide against the body of a character. In addition, some embodiments of the invention describe the operations in a multi-touch environment.

Embodiments of the invention are directed to creating a posing template that is representative of a line of action associated with a character. According to various embodiments, the "line of action" is an imaginary line that extends through the body of the character that serves as the foundation of a pose of the character. Some animators prefer to draw characters in a manner that accentuates the line of action, thereby enhancing the dramatic effect of the pose. Embodiments of the invention provide techniques for the animator to collide the character against the posing template such that the contour of the character conforms to the shape of the posing template. This technique allows the animator to quickly pose the character by reducing the need to individually specify the pose of each of the many intermittent joints of the character.

Various embodiments of the invention provide techniques for the animator to create and manipulate the template, specify which parts of the character should collide with the template, and/or add constraints that can aid in posing the character. In addition, some embodiments of the invention may utilize a multi-touch input surface to collide the character with the template.

System Overview

Figure 1:
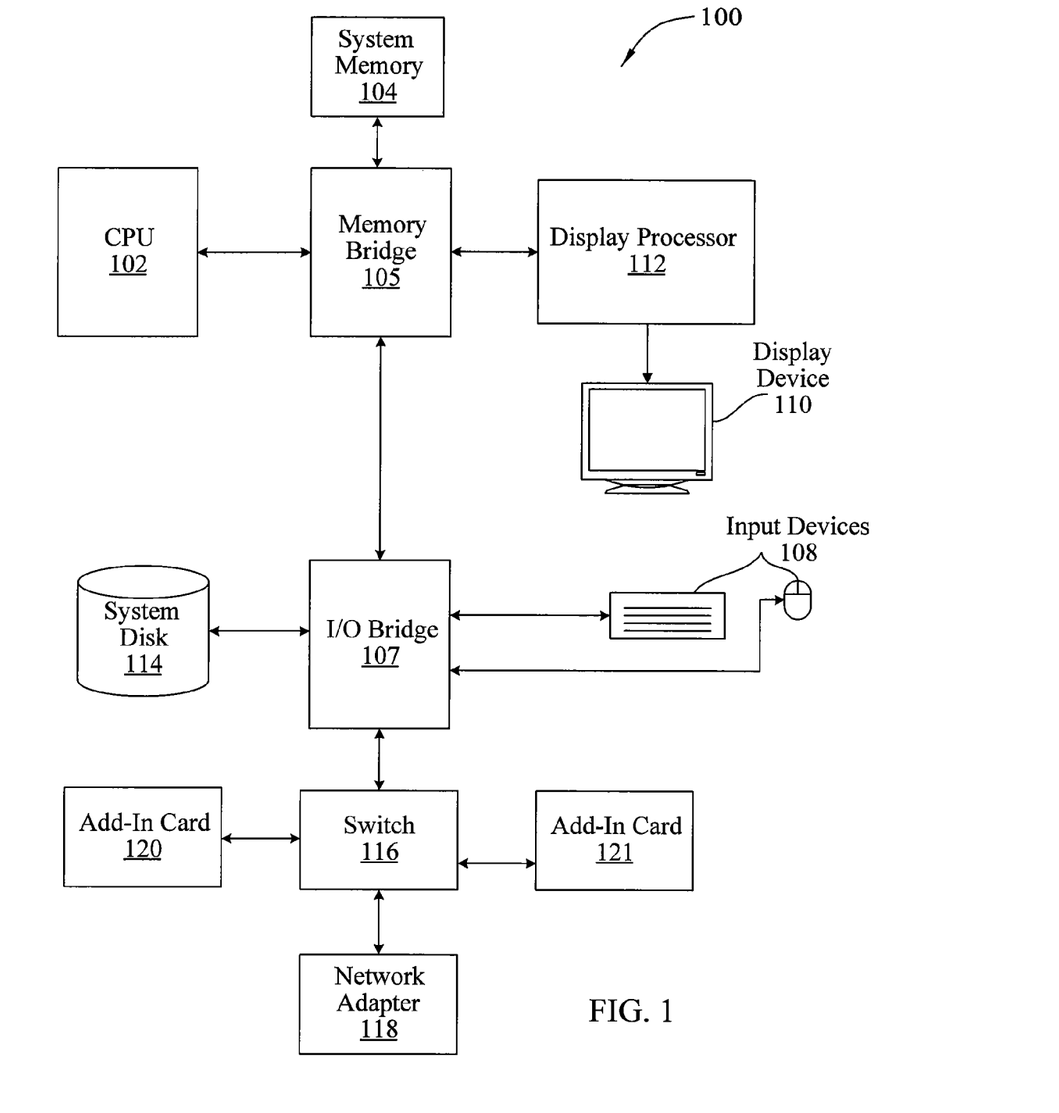
FIG. 1 is a block diagram of a system configured to implement one or more aspects of the invention.

FIG. 1 is a block diagram of a system 100 configured to implement one or more aspects of the present invention.

System 100 may be a computer workstation, personal computer, multi-touch computing device, video game console, personal digital assistant, rendering engine, mobile phone, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, multi-touch screen, still or video cameras, motion sensors, and/or microphones) and forwards the input to CPU 102 via memory bridge 105.

In embodiments where display device 110 is a multi-touch display device, one or more of input devices 108 may be omitted and the user may use his or her hand to provide inputs directly to the multi-touch display device 110. The display device 110 may be configured to use a capacitive sensing, camera generated images, or any other technically-feasible technology used for sensing multi-finger and multi-hand inputs. In other embodiments, a multi-touch input device, such as a multi-touch touchpad, is included in the system 100 that is separate from the display device 110.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

According to embodiments of the invention, one or more cameras can be calibrated. Certain embodiments of the invention may be implemented in software stored in system memory 104 and executed by CPU 102 and/or display processor 112. Other embodiments may be implemented as one or more shader programs executed by display processor 112. Still further embodiments may be implemented in fixed function hardware included within display processor 112. Other embodiments may be implemented as a combination of hardware and software.

Posing an Object

Embodiments of the invention relate to posing an object. More specifically, various embodiments relate to a system and method for posing a graphics object, such as an animated object, a character, or other object. Various embodiments also relate to posing and/or moving models of objects in an interactive application stored in the system memory 104 and executed by the CPU 102. In some embodiments, the interactive application may comprise at least one of an animation application, a computer-aided design (CAD) application, a modeling application, and a game application.

Figure 2A:
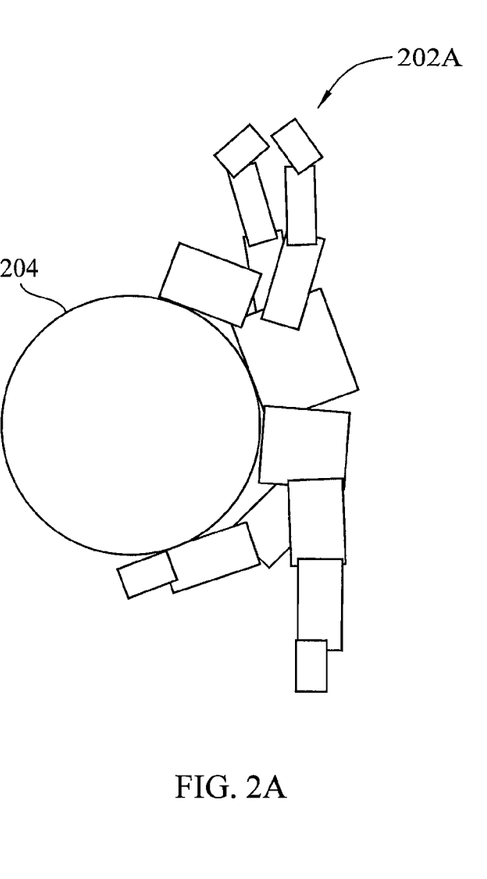
FIGS. 2A-2B are conceptual diagrams illustrating posing a character using a posing template, according to various embodiments of the invention.

FIG. 2A is a conceptual diagram illustrating posing a character 202A using a posing template 204, according to one embodiment of the invention. As shown, the character 202A is composed of several parts represented by blocks that are held together by rotational joints. In one embodiment, one or more parts of the character 202A are constrained to prevent rotation and have collision with the template turned OFF. The other parts can rotate and collide with the template. In some embodiments, the user can specify which body parts can interact with the template. For example, if a part should not interact with the template, then the part cannot rotate or collide with the template. The part does, however, translate with the rest of the body, unless also constrained positionally or made static.

In some embodiments, the posing template 204 is a polygonal static body that can be used to collide against the parts of the character 202A. For example, the posing structure may be a rigid body comprising a sphere. In alternative embodiments, the posing structure may have any shape. In some embodiments, the posing structure may be a non-rigid body. In some embodiments, the posing structure may be selected by a user from a library of available posing structure templates. In an alternative embodiment, a user may create or draw additional posing structure(s) to be used to pose the object. For example, the posing template can be created by placing a touch on a touch-surface or a mouse click in the drawing area of the animation application and then dragging around the drawing area to form the shape of the posing template. Once created, the posing template can be moved by dragging. In some embodiments, using a mouse for input permits only translation of the posing template, but using two touches in the multi-touch system provides four degrees of freedom (DOF). The four DOF include two translation DOF, one rotation DOF, and a scale DOF. Examples of control movements of the posing template include (1) a two DOF translation (e.g., a translation of one or two fingers on a touchpad or trackpad), (2) a one DOF rotation (e.g., a change in angle between two fingers on a touchpad or trackpad), or (3) a one DOF scale (e.g., a change in distance between two fingers on a touchpad or trackpad).

Figure 2B:
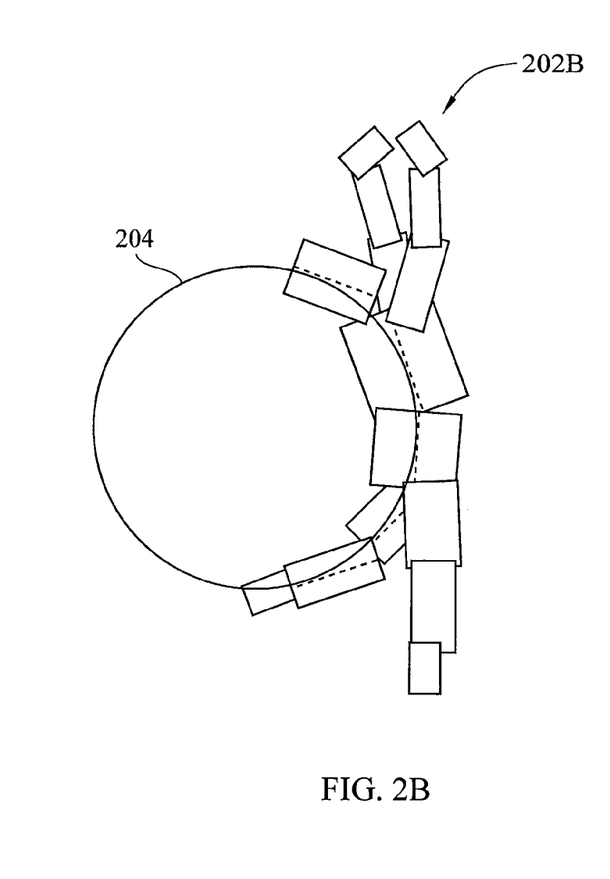

In some embodiments, as shown in FIG. 2A, the contour of the body of the character 202A (e.g., the outer rectangle of each body part) collides with the posing template 204. In another embodiment, as shown in FIG. 2B, the underlying skeleton of the body of the character 202B (e.g., the inner rectangle of body parts) collides with the posing template 204. As shown in FIGS. 2A-2B, colliding the character with the posing template may generate similar results when the contour of the character is collided with the posing template and when the underlying skeleton is collided with the posing template. However, in other embodiments, such when posing stout characters or characters that have cartoony proportions and/or masses, an animator may prefer to collide the character using the underlying skeleton as opposed to the outer contour of the body of the character. In some embodiments, the multi-touch system may allow for two, three, or any number of control points that may be moved to change the shape of the posing template in a non-linear manner.

According to certain embodiments, the entire body of the character could be collided with the posing template. However, when the entire body is collided with the posing template, the pose of the character may be difficult to control since body parts that the user may not want to collide with the posing template would often get in the way. Thus, some embodiments of the invention involve decomposing the body of the character into "chains" comprised of links of body parts that can be manipulated to form a desired shape.

Figure 3A:
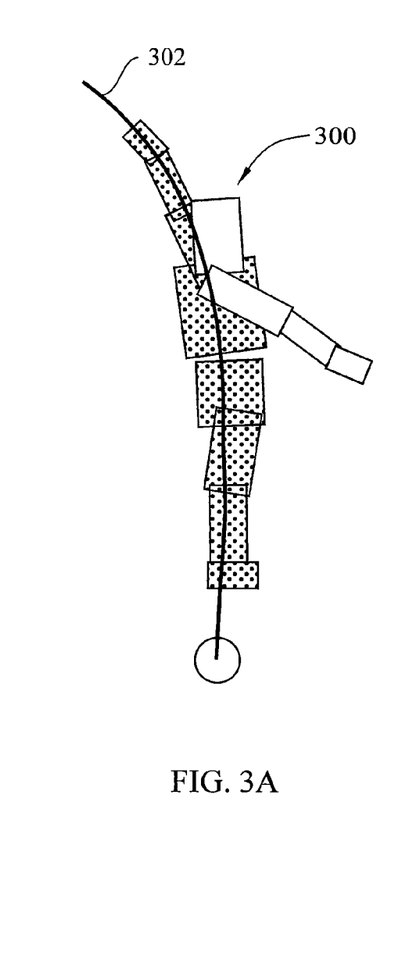
FIGS. 3A-3B are conceptual diagrams illustrating identifying a chain of parts of an object to be posed with a posing template, according to various embodiments of the invention.
Figure 3B:
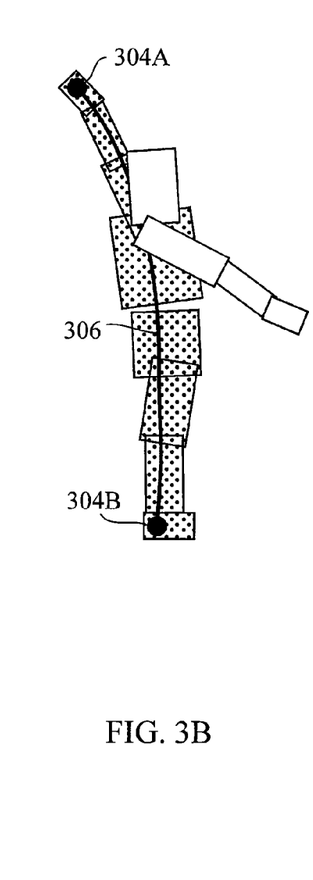

FIGS. 3A-3B are conceptual diagrams illustrating identifying a chain of parts of an object to be posed with a posing template, according to various embodiments of the invention. As shown in FIG. 3A, the animator may draw a stroke 302 through a character 300 to identify which parts of body of the character should be included in the chain. In FIG. 3A, the body parts labeled with dots have been identified as part of the chain. When the character 300 is collided with a posing structure, only the parts of the character 300 specified in the chain are modified by the posing structure. Other components of the character 300 not included in the chain are not modified when collided with the posing structure. In some embodiments, if only a single body part is to be included in the chain, then only that body collides with a template.

In another embodiment, as shown in FIG. 3B, the chain may be identified by the software application based on user input that selects the beginning and end of the chain. For example, when using a multi-touch surface, the animator can specify the chain of body parts that is permitted to collide with the posing template by using one finger to select the start of the chain and another finger to simultaneously select the end of the chain. In FIG. 3B, the two selection points are identified by circles 304A, 304B. The chain may be determined by using a depth-first search from one selected body part 304A to the other selected body 304B part through the connection of joints. As shown, the parts labeled with dots are identified to be included in the chain.

In further embodiments where the animator manipulates the animation environment using a computer mouse, the chain may be specified using two mouse clicks. The selection 304A may be selected with a first mouse click and the selection 304B may be selected with a second mouse click. Similarly, the chain may determined by using a depth-first search from one selected body part 304A to the other selected body 304B part through the connection of joints.

According to some embodiments, in order to create a chain that includes only a single body part, the animator may select the particular body part twice, by making it both the start and end of the chain. In further embodiments, the chain may be specified implicitly. For example, the chain may be specified as (1) the chain made from the currently selected skeletal element to the skeletal element that was previously selected, or, alternatively, (2) the closest predefined chain to the selected posing structure.

Once the chain is identified, an animator using a multi-touch surface could select, using a first finger, one end of the chain, and simultaneously select, using a second finger, the other end of the chain. The animator could then drag both ends of the chain simultaneously to collide the character with the posing template.

As described above, some embodiments involve a multi-touch surface that allows the animator to drag both ends of the chain simultaneously to easily wrap the chain around the posing template. However, embodiments that involve a mouse input only allow the animator to drag one body part at a time. Thus, if the animator selects a body part included in a chain and collides the body part with the posing object, then there may be ambiguity as to how the other parts in the chain should be posed. Accordingly, embodiments of the invention allow for constraints to be added to assist in posing the character.

Figure 4A:
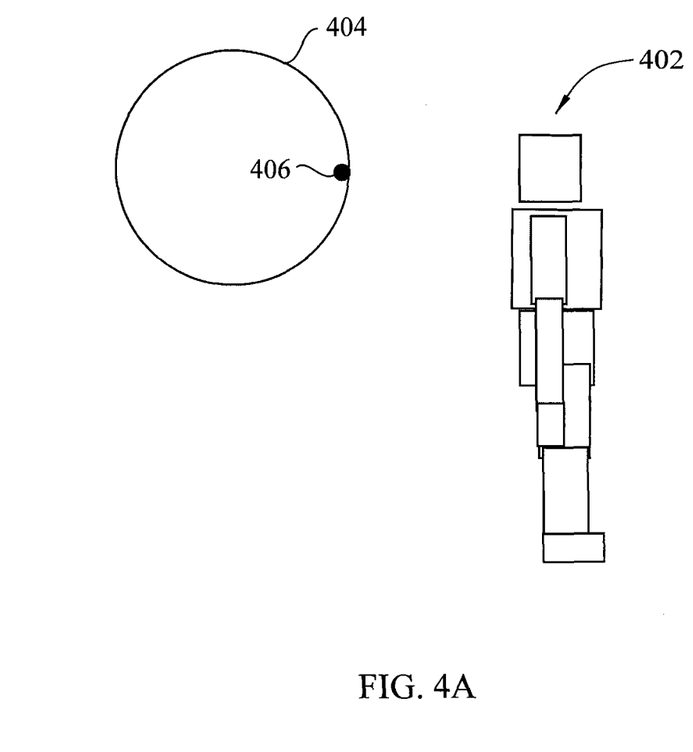
FIGS. 4A-4C are conceptual diagrams illustrating posing a character using a posing template associated with an attachment point, according to various embodiments of the invention.
Figure 4B:
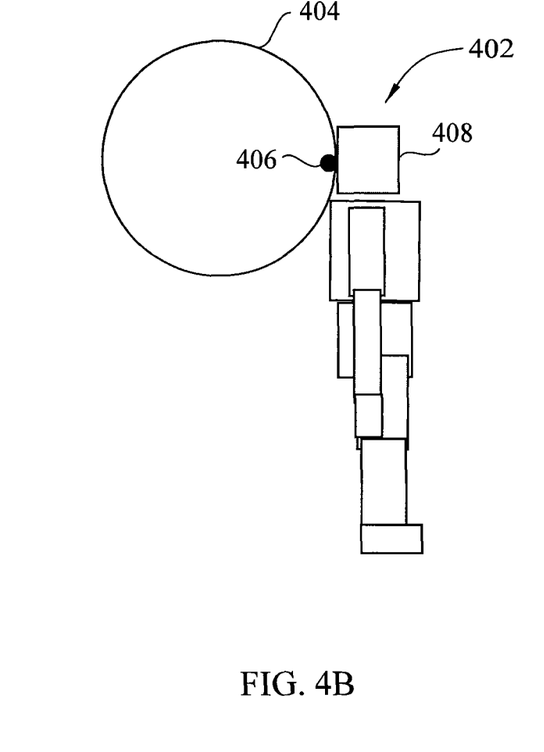
Figure 4C:
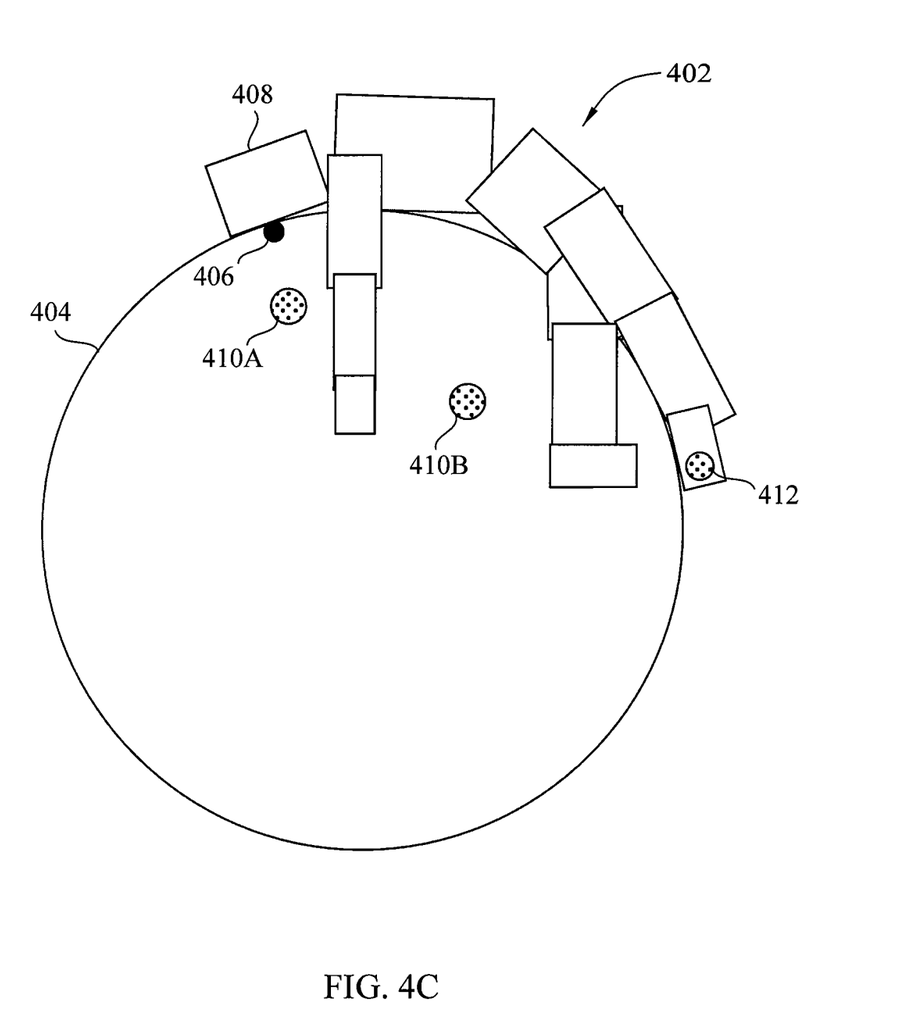

FIGS. 4A-4C are conceptual diagrams illustrating posing a character 402 using a posing template 404 associated with an attachment point 406, according to various embodiments of the invention. In some embodiments, the attachment point acts as an adhesive surface, such as a spike or a magnet, configured to hold a portion of the object placed in contact therewith. For example, when a body part associated with the character 402 is placed in contact with the attachment point 406, the body part is fixed to the attachment point. The other body parts may then be collided with the posing template while the position of the attached body part is constrained to the posing template. In some embodiments, the shape of the posing template may be changed or the posing template may be rotated while the body part is attached to the attachment point, thereby allowing many different poses for the character to be achieved.

In some embodiments, the adhesive surface "attracts" the portion of the object placed in proximity thereto. For example, when a hand of a character is placed within a certain distance of the attachment point associated with a posing object, then the hand may "snap" to the attachment point, which constrains the hand of the character to the attachment point on the posing structure.

In some embodiments, a specific body part is constrained by making the body part a static body in a rigid body simulator associated with the animation application. Also, in some embodiments, a user may use an input device, such as a mouse, to toggle the constraint ON and OFF. For example, the user may use a left mouse click, and then a right mouse click while the left mouse button is still held down on a body part, which may toggle the constraint ON and OFF.

As shown in FIG. 4A, a character 402 is being posed using a posing template 404 that includes an attachment point 406. In FIG. 4B, the head 408 of the character 402 is constrained by the attachment point 406. As also shown in FIG. 4B, the other body parts of the character 402 are not constrained to the posing template 404 and hang freely.

As shown in FIG. 4C, the character 402 is posed using the posing template 404. The head 408 is shown constrained to the attachment point 406, similar to illustration shown in FIG. 4B. FIG. 4C also shows other body parts that are included in a chain being posed by the posing template 404. Body parts not included in the chain, such as one of the arms and one of the legs, are not posed by the posing template 404 and hang freely within the posing template 404. As shown, the posing template has been rotated and enlarged relative to the posing template shown in FIGS. 4A-4B. As described herein, the posing template may be rotated and enlarged using a two finger input 410A, 410B on a multi-touch surface. In addition, the foot 412 of the character has been selected and collided with the rotated and enlarged posing template 404. In some embodiments, the two finger input 410A, 410B is input by the user using a first hand (e.g., a non-dominant hand) that controls the posing template 404, and the foot input 412 is input by the user using a second hand (e.g., a dominant hand) that controls the character 402. Bimanual interaction in this manner allows for easier and more intuitive manipulation of the pose of the character. For example, implementing the posing technique reduces the number of inputs (such as touch contacts or mouse clicks) that an animator may have to enter or maintain to achieve the desired pose.

As described, some embodiments may involve bimanual interaction where one hand of the user may control the posing template, whereas, the other hand of the user may control the object being posed. For example, the user may manipulate a first user input device with the left hand to control the posing structure and may manipulate a second user input device with the right hand to control the object to be posed. In another example, the interface may be displayed on a multi-touch surface, where the user may manipulate the posing template with a non-dominant hand and simultaneously manipulate the character with a dominant hand.

Additionally, in some embodiments, more than one posing template may be used to simultaneously pose the character. For example, some portions of the character may be collided with a first posing template to pose a first portion of the character, while other portions of the character may be collided with a second posing template to pose a second portion of the character.

As described herein, embodiments of the invention may be used to pose a two-dimensional (2D) object against a 2D posing template. In addition, posing three-dimensional (3D) geometry against a 3D posing template is also within the scope of embodiments of the invention.

Figure 5:
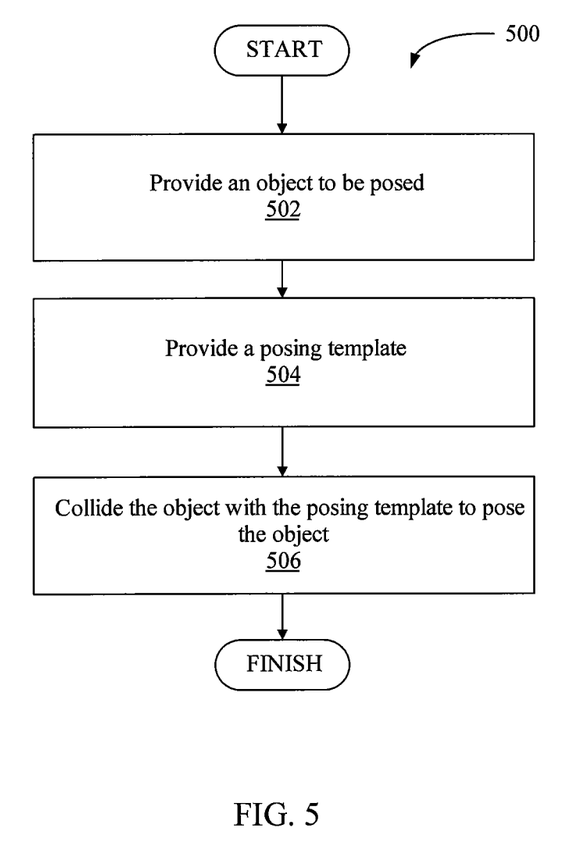
FIG. 5 is a flow diagram of method steps for posing a character using a posing template, according to one embodiment of the invention.

FIG. 5 is a flow diagram of method steps for posing a character using a posing template, according to one embodiment of the invention. Persons skilled in the art will understand that, even though the method 500 is described in conjunction with the system of FIGS. 1-4C, any system configured to perform the method steps, in any order, is within the scope of embodiments of the invention.

As shown, the method 500 begins at step 502, where an object to be posed is provided by an interactive application executed by a processor included in a computer system. In one embodiment, the multi-touch surface includes a processor that performs the steps of the method 500. In alternative embodiments, a processor included in computer system coupled to the multi-touch surface may include the processor that performs the steps of the method 500. In further embodiments, the method steps are performed by a combination of processors included in the multi-touch surface and/or the computer system coupled to the multi-touch surface. In some embodiments, the object is an rigid, articulated object that includes one or more sub-objects associated with one another with one or more joints. In other embodiments, the object is a non-rigid or deformable object.

As described herein, in some embodiments, the object to be posed is a graphics object. For example, the object to be posed may be a graphics object representing a character in an animation application, where the character includes various body part components that make up the shape of the character. In some embodiments, the object may be drawn by an animator using the animation application. In other embodiments, the object may be provided in a library of objects or may be downloaded from the Internet.

At step 504, a posing template is provided by the animation application executed by the processor. In one embodiment, the posing template is a rigid body. For example, the posing template may be a sphere. In alternative embodiments, the posing template may have any shape. In some embodiments, the posing template may be selected by a user from a library of available posing templates. In an alternative embodiment, a user may create or draw additional posing template(s) to be used to pose the object.

At step 506, the object is collided with the posing template to pose the object. As described herein, a user may manipulate one or more input device to collide the object with one or more posing templates. In some embodiments, posing the object comprises positioning the object to conform to at least a portion of a posing path defined by the posing structure. In one embodiment, the posing path is a curve. In alternative embodiments, the posing path is a line or line segment. In some embodiments, the portion of the posing path comprises the entire posing path.

As described herein, various embodiments of colliding the object with the posing template are within the scope of embodiments of the invention. In some embodiments, the outer boundaries of the parts that compose the object are collided with the posing template to pose the object. In other embodiments, an internal skeletal structure of the object is collided with the posing template to pose the object. In some embodiments, a chain of parts included in the object may be specified that is collided with the posing template, where parts not included in the chain are not collided with the posing template. In some embodiments, an attachment point, such as a spike or magnet, may be used to constrain a specific part of the object to the posing template to assist in posing the object. In addition, bimanual manipulation of the posing template and/or the object is within the scope of embodiments of the invention.

In addition, in some embodiments, the posing template may have an elasticity characteristic. For example, the posing template may be a non-rigid body. In these embodiments, when the object is collided with the posing template, the posing template may be deformed while posing the object. For example, the posing template may have a "sponge-like" quality such that when an object is collided with the posing template, the object is posed against the posing template, but the posing template is deformed from the force applied when the object is collided with the posing template. In some embodiments, the amount of elasticity of the posing template and/or the object may be configurable by the user.

Figure 6:
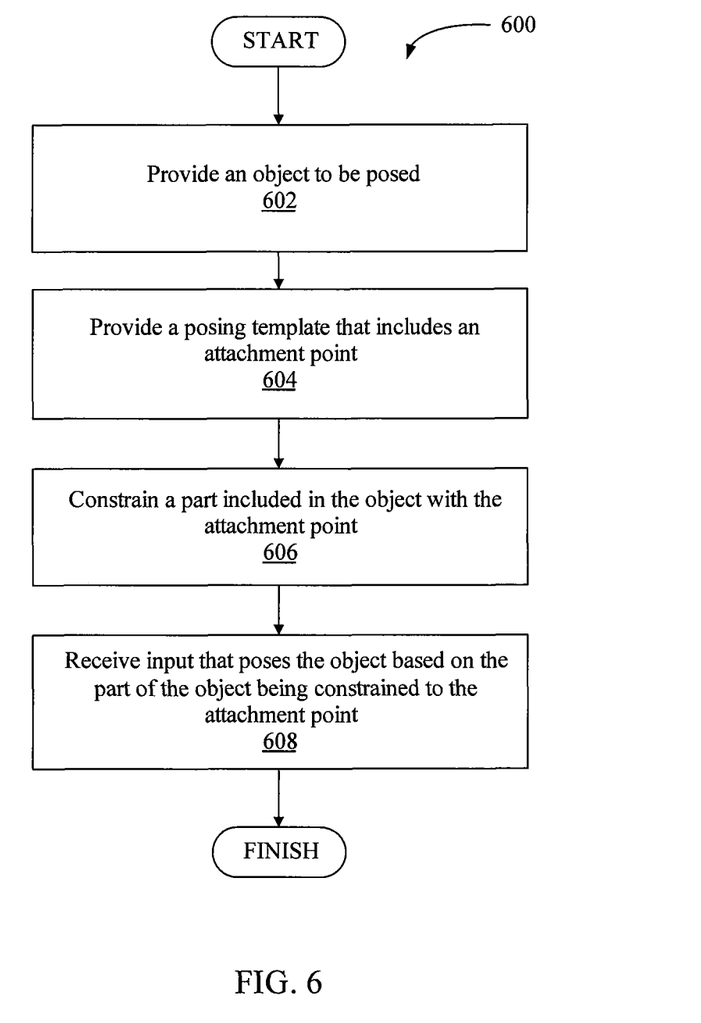
FIG. 6 is a flow diagram of method steps for posing a character using a posing template associated with an attachment point, according to one embodiment of the invention.

FIG. 6 is a flow diagram of method steps for posing a character using a posing template associated with an attachment point, according to one embodiment of the invention. Persons skilled in the art will understand that, even though the method 600 is described in conjunction with the system of FIGS. 1-4C, any system configured to perform the method steps, in any order, is within the scope of embodiments of the invention.

As shown, the method 600 begins at step 602, where an object to be posed is provided by an animation application executed by a processor included in a computer system. In one embodiment, the multi-touch surface includes a processor that performs the steps of the method 600. In alternative embodiments, a processor included in computer system coupled to the multi-touch surface may include the processor that performs the steps of the method 600. In further embodiments, the method steps are performed by a combination of processors included in the multi-touch surface and/or the computer system coupled to the multi-touch surface.

As described herein, in some embodiments, the object to be posed is a graphics object. For example, the object to be posed may be a graphics object representing a character in an animation application, where the character includes various body part components that make up the shape of the character. In some embodiments, the object may be drawn by an animator using the animation application. In other embodiments, the object may be provided in a library of objects or may be downloaded from the Internet.

At step 604, a posing template that includes an attachment point is provided by the animation application executed by the processor. In one embodiment, the posing template is a rigid body. For example, the posing template may be a sphere. In alternative embodiments, the posing template may have any shape. In some embodiments, the posing template may be selected by a user from a library of available posing templates. In an alternative embodiment, a user may create or draw additional posing template(s) to be used to pose the object.

As described in greater detail herein, the attachment point acts as an adhesive surface, such as a spike or a magnet, configured to hold a portion of the object placed in contact therewith.

At step 606, a processor causes a part included in the object to be constrained to the attachment point. In some embodiments, a user input selects which part, such as a body part, of the object to be associated with the attachment point. In some embodiments, when the distance between the attachment point and a part of the object is less than the particular threshold amount, then the part of the object may "snap" to the attachment point to constrain the part of the object. In some embodiments, the threshold amount can be modified by the user.

At step 608, the processor receives input that poses the object based on the part of the object being constrained to the attachment point. As described herein, when a part of the object is constrained to the attachment point, the other parts of the object may hang freely, as shown in FIG. 4B. The input received at step 608 causes the object to be posed by colliding at least one other part of the object with the posing template. For example, if the head of a character is constrained by the attachment point, the user may collide the foot of the character against the posing template to achieve the final pose. In some embodiments, other body parts included in a chain that includes the head and the foot are also collided with the posing template.

In sum, embodiments of the invention provide a technique for creating shapes that represent the line of action, where a character can be posed by colliding the character against the shape. In addition, using a multi-touch interface, a user can quickly draw out a posing template and dynamically perform a linear transform with one hand, while positioning the pose of the character with the other hand. According to various embodiments, the linear transform may be translation operation, a rotation operation, a scaling operation, or any other technically feasible linear deformation. In other embodiments, such as those where the posing template comprises a non-rigid object, a non-linear deformation may be performed to modify the shape of the posing template.

One advantage of embodiments of the invention is that the character can be posed very quickly since the need to specify intermittent joints is reduced or eliminated. Another advantage provided by embodiments involving a multi-touch surface is that users can easily manipulate and modify the character and/or the posing template when posing the object.

Accordingly, the user interactively guides the posing of the object until the desired pose is achieved, thereby providing a technique for posing the object with less mouse clicks.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description, drawings, and appendices are, accordingly, to be regarded in an illustrative rather than a restrictive sense.

What is claimed is:

1. A computer-implemented method for generating a pose of an object in an interactive application executing on a processor, the method comprising:
   receiving a posing template that defines a posing path to collide with a graphics object, wherein the posing path defined by the posing template is associated with a graphics tool usable for specifying conformation information for the graphics object, and wherein the posing template is not included in a set of rendered images generated from the graphics object;
   receiving the graphics object to be posed, wherein the graphics object includes geometry defining one or more sub-objects connected by a chain of one or more articulated joints;
   receiving, by operation of the application executing on the processor, a user input that collides the graphics object with at least a portion of the posing path defined by the posing template; and
   in response to the collision between the graphics object and the portion of the posing path, positioning one or more of the articulated joints such that a contour of the chain conforms to the collided portion of the posing path.

2. The method of claim 1, wherein the posing template comprises a rigid body.

3. The method of claim 2, further comprising receiving a second user input that transforms the posing template.

4. The method of claim 3, wherein transforming the posing template comprises translating, rotating, scaling, and/or performing another linear deformation to the posing template.

5. The method of claim 2, further comprising receiving a second user input that transforms the posing template using a non-linear deformation.

6. The method of claim 1, wherein the posing template comprises a non-rigid body.

7. The method of claim 1, wherein the posing template includes a portion modeled as an adhesive surface configured to adhere to a portion of the graphics object placed in contact with the adhesive surface.

8. The method of claim 7, wherein the adhesive surface comprises an attractive surface that attracts the portion of the graphics object when the graphics object is placed proximate to the attractive surface.

9. The method of claim 8, wherein portions of the graphics object included in a chain of parts included in the graphics object are posed along the posing path defined by the posing template, and portions of the graphics object not included in the chain of parts are not posed along the posing path defined by the posing template.

10. The method of claim 1, wherein positioning the graphics object to conform to at least the portion of the posing path comprises receiving a first user input via a first hand of a user to position the graphics object within the interactive application and receiving a second user input via a second hand of the user to position the posing template within the interactive application.

11. The method of claim 1, wherein the interactive application comprises at least one of an animation application, a computer-aided design (CAD) application, and a game application.

12. The method of claim 1, wherein positioning the graphics object to conform to at least the portion of the posing path comprises colliding the graphics object with the posing template.

13. The method of claim 1, wherein the graphics object comprises an articulated figure or a non-rigid figure.

14. A non-transitory computer-readable storage medium storing instructions that, when executed by a processor, cause a computer system to generate a pose of an object in an interactive application, by performing the steps of:
   receiving a posing template that defines a posing path to collide with a graphics object, wherein the posing path defined by the posing template is associated with a graphics tool usable for specifying conformation information for the graphics object, and wherein the posing template is not included in a set of rendered images generated from the graphics object;
   receiving the graphics object to be posed, wherein the graphics object includes geometry defining one or more sub-objects connected by a chain of one or more articulated joints;
   receiving a user input that collides the graphics object with at least a portion of the posing path defined by the posing template; and
   in response to the collision between the graphics object and the portion of the posing path, positioning one or more of the articulated joints such that a contour of the chain conforms to the collided portion of the posing path.

15. The computer-readable storage medium of claim 14, wherein the posing template includes a portion modeled as an adhesive surface configured to adhere to a portion of the graphics object placed in contact with the adhesive surface.

16. The computer-readable storage medium of claim 15, wherein the adhesive surface comprises an attractive surface that attracts the portion of the graphics object when the graphics object is placed proximate to the attractive surface.

17. The computer-readable storage medium of claim 16, wherein portions of the graphics object included in a chain of parts included in the graphics object are posed along the posing path defined by the posing template, and portions of the graphics object not included in the chain of parts are not posed along the posing path defined by the posing template.

18. The computer-readable storage medium of claim 14, wherein positioning the graphics object to conform to at least the portion of the posing path comprises receiving a first user input via a first hand of a user to position the graphics object within the interactive application and receiving a second user input via a second hand of the user to position the posing template within the interactive application.

19. The computer-readable storage medium of claim 14, wherein positioning the graphics object to conform to at least the portion of the posing path comprises colliding the graphics object with the posing template.

20. A computer system, comprising:
a processor; and
a memory storing instructions that when executed by the processor cause the computer system to generate a pose of an object in an interactive application by performing the steps of:
receiving a posing template that defines a posing path to collide with a graphics object, wherein the posing path defined by the posing template is associated with a graphics tool usable for specifying conformation information for the graphics object, and wherein the posing template is not included in a set of rendered images generated from the graphics object,
receiving the graphics object to be posed, wherein the graphics object includes geometry defining one or more sub-objects connected by a chain of one or more articulated joints,
receiving a user input that collides the graphics object with at least a portion of the posing path defined by the posing template, and
in response to the collision between the graphics object and the portion of the posing path, positioning one or more of the articulated joints such that a contour of the chain conforms to the collided portion of the posing path.

\* \* \* \* \*